United States Patent [19]
Perchak

[11] Patent Number: 5,448,362
[45] Date of Patent: Sep. 5, 1995

[54] NON-CONTACT MEASUREMENT OF DISPLACEMENT AND CHANGES IN DIMENSION OF ELONGATED OBJECTS SUCH AS FILAMENTS

[76] Inventor: Robert M. Perchak, P.O. Box 750534, Dayton, Ohio 45475

[21] Appl. No.: 86,092

[22] Filed: Jul. 6, 1993

[51] Int. Cl.$^6$ .............................................. G01B 11/10
[52] U.S. Cl. ................... 356/385; 356/375; 250/559.26; 250/559.29
[58] Field of Search ............... 356/385, 386, 238, 430, 356/373; 250/571, 572, 560, 561, 562

[56] References Cited

U.S. PATENT DOCUMENTS

| | | | |
|---|---|---|---|
| 4,417,147 | 11/1983 | Faville | 250/560 |
| 4,895,449 | 1/1990 | Marshall | 250/560 |
| 5,012,086 | 4/1991 | Barnard | 250/561 |
| 5,078,333 | 1/1992 | Hester | 250/571 |
| 5,130,556 | 7/1992 | Duncan et al. | 250/560 |
| 5,291,024 | 3/1994 | Barea | 250/561 |

Primary Examiner—F. L. Evans
Attorney, Agent, or Firm—Joseph G. Nauman

[57] ABSTRACT

Methods and apparatus for measuring the lateral displacement and changes in the lateral dimension of thin long objects, particularly filament materials such as wire or various fibers. The material may move quasi-statically or at a high rate of speed. The simplest embodiment of this invention utilizes a light source such as an incandescent lamp, a laser, a light emitting diode, etc., to produce a collimated beam of light. The light traverses the sample region and impinges on a detector including least two precisely separated photosensors arranged at a predetermined angle to the object to monitor and/or measure changes in lateral dimension and displacement detection. Displacement information which can be derived from the method and apparatus can be utilized to determine the vibration and also the tension in a monitored filament or the like. A beam splitter can be used to produce multiple output beams directed to separate detectors.

16 Claims, 9 Drawing Sheets

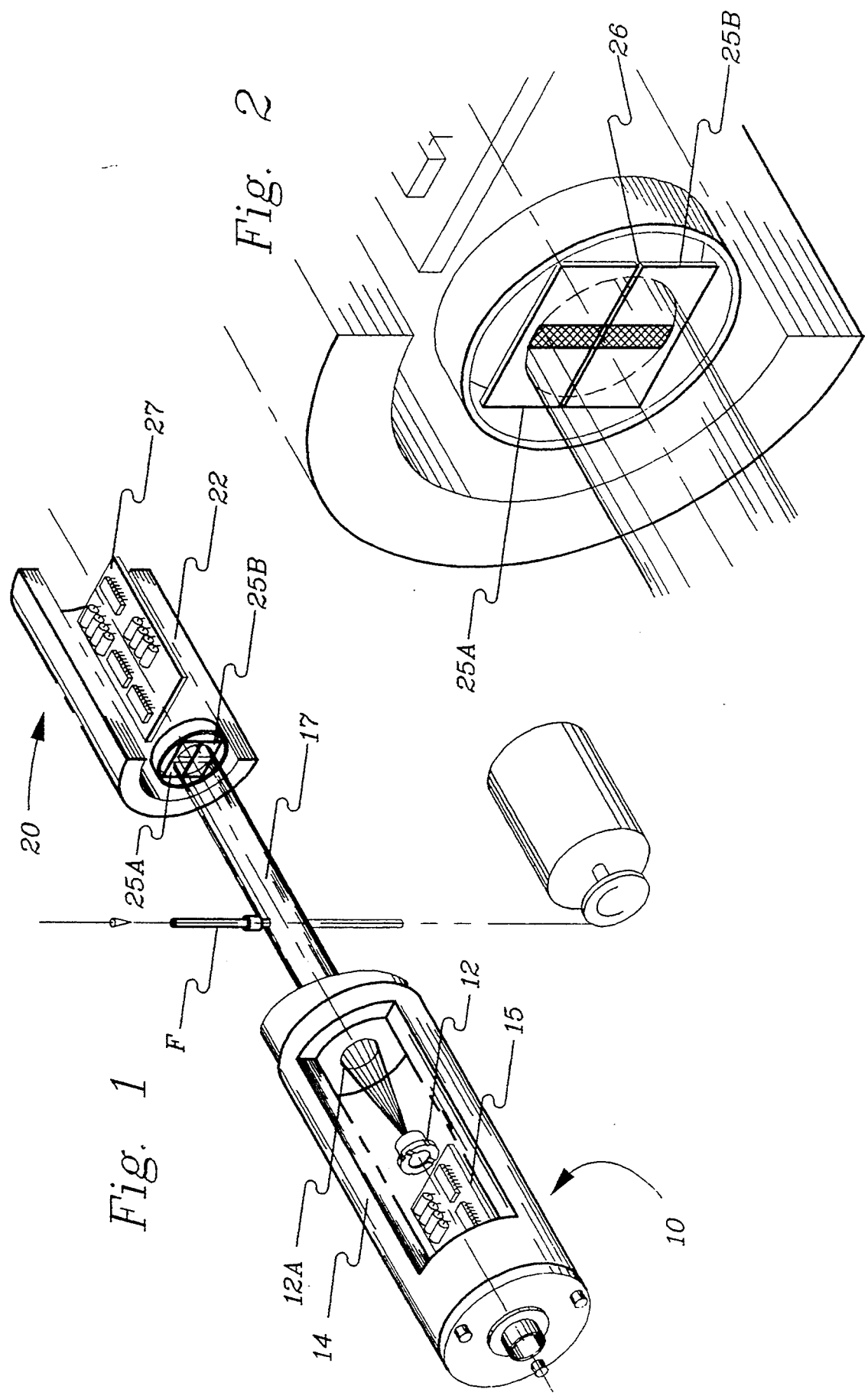

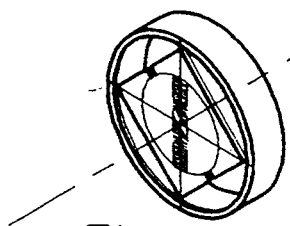
Fig. 6A
T1
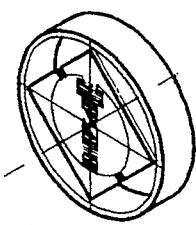
Fig. 6B
T2
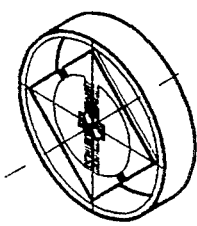
Fig. 6C
T3
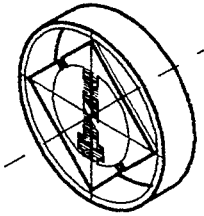
Fig. 6D
T4
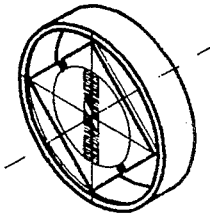
Fig. 6E
T5
Fig. 6F
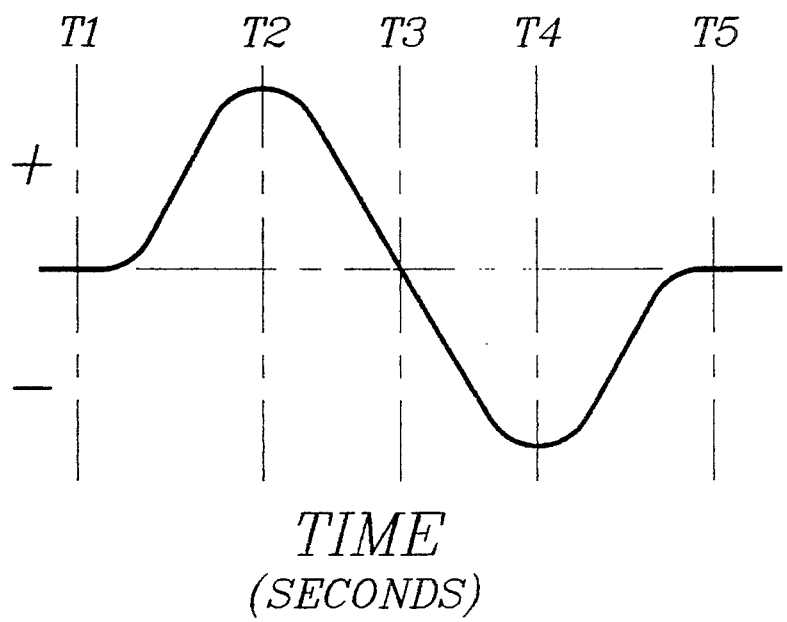

Fig. 7
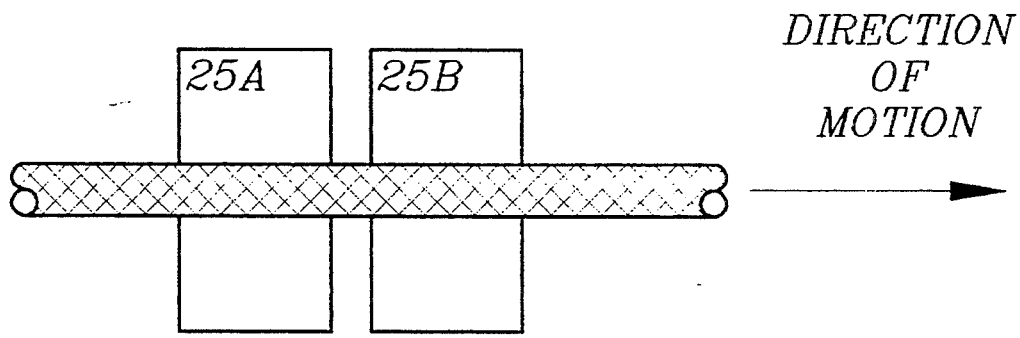
Flaw | | Signal
---|---|---
 | Fig. 7A | 
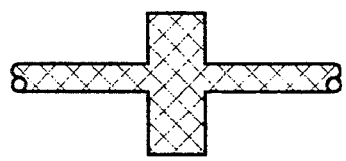 | Fig. 7B | 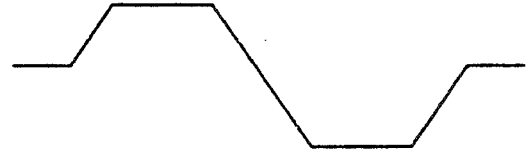
 | Fig. 7C | 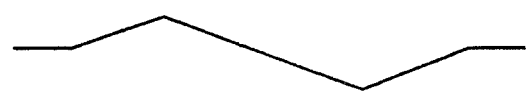
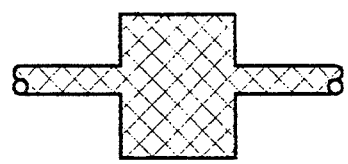 | Fig. 7D | 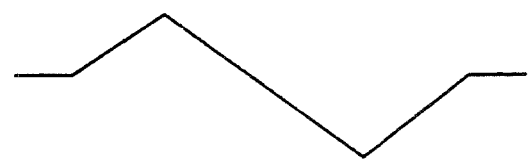
 | Fig. 7E | 
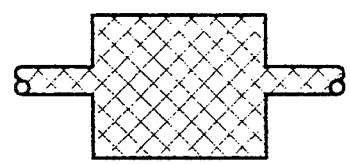 | Fig. 7F | 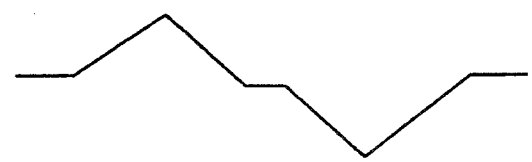

NON-CONTACT MEASUREMENT OF DISPLACEMENT AND CHANGES IN DIMENSION OF ELONGATED OBJECTS SUCH AS FILAMENTS

BACKGROUND OF THE INVENTION

1. Field of the Invention

The present invention relates to measuring the lateral displacement and/or the lateral dimension and changes in its lateral dimension of an object, particularly a moving filament or wire, from its nominal path. The term "filament" is used generically hereinafter with respect to both metal and non-metallic strands.

2. Description of the Prior Art

The manufacture of metal wire and glass or plastic filaments involves some common steps, namely the drawing of the filament. Metal wire is usually drawn from a billet through several dies, and the path is generally horizontal to the take-up. Glass filaments or filaments of synthetic materials are usually drawn vertically downward to a take-up. Either orientation of the forming filament should be accommodated by measuring apparatus. Such drawing operations operate at high speed, and are closely controlled so as to produce filaments of uniform density and diameter, and it is most important to have an accurate means of measuring the lateral dimension or diameter of the filament without contacting the material being drawn. By way of example, filament speeds in glass fiber manufacturing can be in the order of 5,000 meters/minute, and in wire manufacturing can be in the order of 1,000 meters/minute.

It is also important to recognize and identify any displacement of the filament from its designated path of movement at these high speeds. The diameter of the filament can be measured (by techniques disclosed hereinafter, or by other techniques), or the diameter can be estimated as a known value. Vibration in the length of the moving (running) filament will result in related waves of corresponding frequency in the filament length. Knowing the mass per unit length of the filament, by determining the displacement due to such vibration, it is possible to calculate the tension in the filament, on an ongoing basis. This ability has a number of advantages for process control purposes.

Many different techniques have been proposed for measuring filament dimension and/or displacement. These techniques fall generally into two categories: a) scanning devices and b) non-scanning devices. Scanning devices further are divided into two categories: 1) scanned light source, and 2) scanned sensing of light.

In the case of category a1) the scanned light is mechanically or optically moved laterally past the object; see for example U.S. Pat. No. 3,765,774 issued 16 Oct. 1973. The time that the light is not present at the receiver is proportional to the lateral dimension of the object. In category a-2), the light source is stationary and the receiver is scanned laterally across the object. Both scanning cases have the advantage of simplicity and the disadvantages of scan-to-scan variation and limitations on the scanning rate, thus limiting the number of samples of the object and subsequent failure to measure every portion of the object, particularly if it is in motion past the scanning device at a speed approximately greater than the width of the scanning light beam (for category a-1) or the width of the field of view for the receiver (for category a-2) multiplied by the number of scans per unit time.

With regard to non-scanning devices, a light beam is generally produced that is uniform in amplitude or brightness across the beam, is usually collimated so as to produce a nearly parallel beam. Interposing an object in such beam blocks off an amount of light that is proportional to the diameter of the object. The advantage of this technique is that continuous measurement of the lateral dimension of the object is possible. The drawbacks are that the apparatus requires very uniform illumination of the object, sensitivity to background or stray light, inability to measure lateral position, and sensitivity to gradual changes in the lateral dimension of the object to be measured.

SUMMARY OF THE INVENTION

In view of the foregoing state of the art, it is evident that an improved apparatus and method is needed for measuring lateral displacement and lateral dimension of filaments in the process of their creation. The invention, in accordance with certain of its aspects, provides such an improved apparatus and method of measuring lateral displacement, and lateral dimension comprising the steps of:

a) providing a light or other radiation source, herein to be called the transmitter;

b) providing a light or radiation sensing area comprised of at least two sensors, herein called the detector or target;

c) providing an area or zone that physically exists between the transmitter and the detector for the introduction of the object to be measured;

d) longitudinally moving the object, e.g. a filament, between the transmitter and detector in a direction perpendicular to the optical axis;

e) sensing the light or radiation level for the sensors present in the detector;

f) measuring the sums, differences, differentials, and integration of the information obtained from the detector in order to calculate the lateral displacement, lateral dimension, vibration, tension, and other characteristics of the object.

Thus the invention comprises methods and apparatus for measuring the lateral displacement and changes in the lateral dimension of thin long objects, particularly filament materials such as wire or various fibers. The principles of the invention are also applicable to other similar processes, such as manufacture of pipe or rod; in the case of pipe of relatively large diameter (as compared to filaments) the image (shadow) of a segment of the pipe introduced between the radiation transmitter and the detector can be optically reduced to a size comparable to the detector surfaces. The material may move quasistatically or at a high rate of speed. The simplest embodiment of this invention utilizes a light source such as an incandescent lamp, a laser, a light emitting diode, etc., to produce a collimated beam of light. The light traverses the sample region and impinges on a detector including at least two precisely separated photosensors arranged at a predetermined angle to the object to monitor and/or measure changes in lateral dimension and displacement detection. Displacement information which can be derived from the method and apparatus can be utilized to determine the vibration and also the tension in a monitored filament or the like.

It is a principal object of the invention to provide a method of monitoring elongated objects, particularly moving filaments, by radiating a segment of the object with a beam of radiation having known amplitude distribution function, and impinging the beam, as modified by the object placed within the beam, onto a detector including at least two sensors mounted in spaced relation and having separate outputs for each sensor; to provide such a method wherein the difference of the sensor output signal is determined by a difference amplifier and can be used as a control signal; to provide apparatus for performing such methods, including a radiation source and beam forming device (preferably for a collimated beam), and a detector which includes a pair of radiation sensors having flat surfaces in coplanar closely spaced relation, and a difference amplifier receiving output signals from each of the sensors.

Other objects and advantages of the invention will be apparent from the following description, the accompanying drawings and the appended claims.

BRIEF DESCRIPTION OF THE DRAWINGS

FIG. 1 is a perspective view of a continuous filament inspecting system according to the invention;

FIG. 2 is an enlarged perspective view of the target/detector part of the system shown in FIG. 1;

FIGS. 6A, 6B, 6C, 6D, and 6E show a progression of an image of an enlargement in a filament projected onto a detector as the filament moves past the detector at an angle of approximately 45° to the separation between the sensors of the detector, and 6F shows a waveform related in time to the progression of the image;

FIG. 7 and FIGS. 7A, 7B, 7C, 7D, 7E and 7F comprise a chart showing typical output signal waveforms for a number of different filament flaws, which are shown schematically;

DESCRIPTION OF THE PREFERRED EMBODIMENTS

Figure 3A:
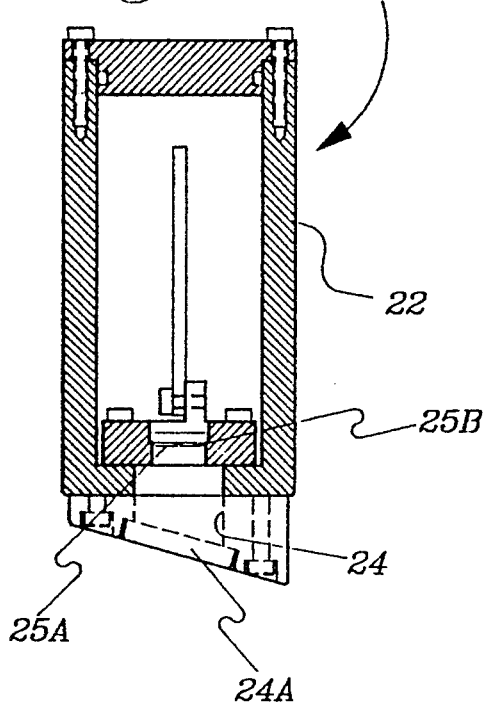
FIGS. 3A and 3B together comprise an enlarged cross-section view of the light source and target/sensor parts of the system.

Referring to FIG. 1, a filament inspection system according to the invention includes a first part 10 in the form of a light (or radiation) source 12, such as an incandescent lamp, laser (particularly a diode laser), light emitting diode, x-ray source, etc., supported in a housing 14 together with a power or driver circuit board 15 for energizing the source 12, and a collimating lens 16 (FIG. 3B) for the resulting light beam 17, which lens is located within an exit window 18. Window 18 may include a protective optical flat 18A. A preferred source of radiation is a collimated diode laser. For purposes of simplicity in explanation, visible light will be referred to in the embodiment, although any source of radiation compatible with the detectors employed could be suitably employed.

The system also includes a detector/target part 20 supported within a housing 22 which has an entrance window 24 protected by a further optical flat 24A, a detector provided by a pair of optically and electrically independent photodetector sensors 25A, 25B supported side by side along a separation space or slot 26, in housing 22. These sensors detect radiation from beam 17, and the outputs of the sensors lead to an output circuit board 27, as later described. Commercially available bi-cell detectors have been used in an actual embodiment, although it is possible to use separate photodetectors, so long as they are supported adjacent each other evenly spaced along their adjacent sides.

In this embodiment, the nature of the diode laser source 12 is to produce a somewhat elliptical and diverging beam 12A, which is then collimated by lens 16 resulting in beam 17, If a shaping aperture is required with other radiation sources, an aperture plate formed of any material opaque to the radiation from source 12, and having a specifically defined aperture A forming a described passage and beam shape for the exiting radiation beam 17, may be mounted in the space between lens 16 and the exit window optical member 19. The light amplitude distribution is the general shape of the distribution from the preferred laser diode light source, and that distribution is typically of the well known Gaussian shape. The cross-sectional area of beam 17, before any alteration by an intervening object, is symmetrical with respect to the areas of sensors 25A, 25B The object to be measured or examined, in the illustrated embodiment a moving filament F, is guided perpendicular to the path between the two windows 18 and 24, thus forming a "shadow" on photodetectors 25A and 25B from a region of the filament passing through beam 17. The object will have characteristics such that it will alter the beam, as by absorption, reflection, refraction, or other displacement, resulting in corresponding changes in the shape of beam 17 eventually impinging on detector sensors 25A, 25B. Thus, the integrated radiation impinging on each of the sensors is continually changed, according to changes in the dimension or displacement of the incremental segment of the filament traversing the beam (or impinged by the beam) at any given time. This results in ongoing changes in sensors outputs, as resulting from bumps or neck-down regions in the passing filament or other object, or due to displacement of the filament from its normal path P.

Figure 5:
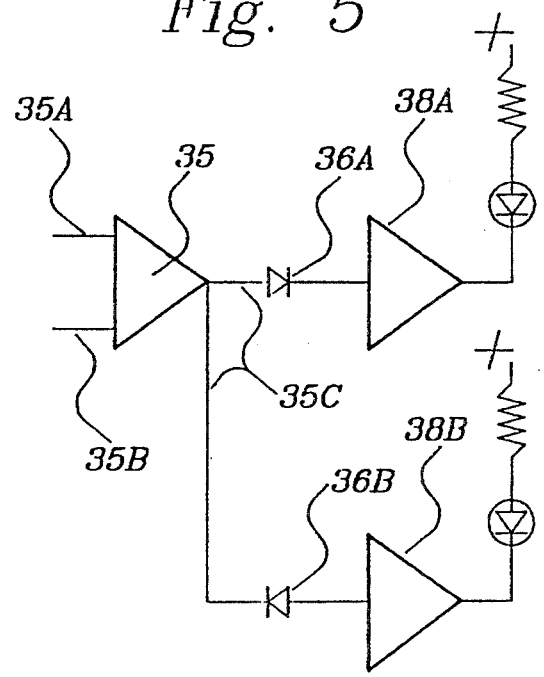
FIG. 5 is a block diagram of the basic electrical connection of detectors that embodies the method of measurement.

Referring to FIG. 5, photodetector 25A is connected to the inverting input 35A of a difference amplifier 35 and to ground, and photodetector 25B is connected to the non-inverting input 35B of difference amplifier 35 and to ground (these connections could be reversed). The output 35C of difference amplifier 35 represents the electrical difference between the amounts of light that photodetectors 25A and 25B receive from the light source. Positive going outputs from difference amplifier 35 are coupled through diode 36A to a first comparator circuit 38A, and the output signal from that circuit corresponds to enlargements (or "bumps") on the passing filament. Negative going outputs from difference amplifier 35 are coupled through diode 36B to a second comparator circuit 38B, and the output signal from comparator 38B corresponds to regional decreases in size, usually in diameter ("neck-downs") in the passing filament.

Figure 4:
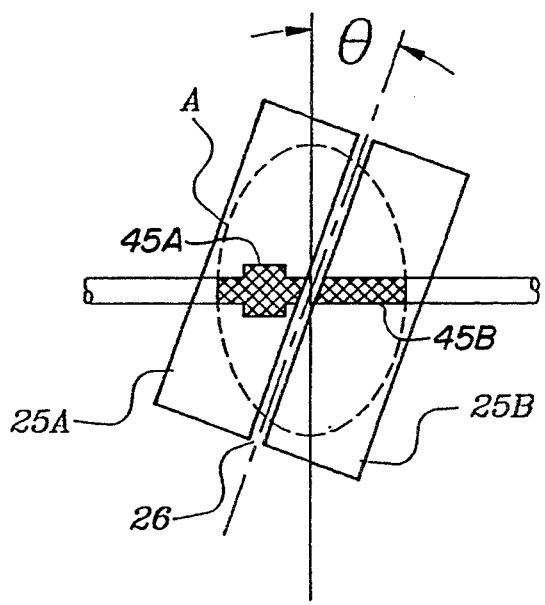
FIG. 4 is a schematic drawing illustrating the basic sensor components and their configuration in the system.

Referring to FIG. 4, by knowing the amplitude distribution for light source 12, an appropriate aperture shape A can be chosen for an angle $\theta$ (theta), greater than 0° and less than 90°, of the sensor dividing space 26 such that as the object F is displaced laterally along the y axis and the difference signal output 35C in FIG. 5 varies in a desired fashion. The shape of the radiation beam (as indicated by the oval area overlying the sensor surfaces, is symmetrical with respect to the two sensor surfaces of the detector. The preferred relationship of sensor output to changes in total radiation impingement on the sensor surface is linear, but could be other functional relationships such as logarithmic, etc. It should be noted that not only can the aperture be varied in shape to obtain the desired relationship between the lateral displacement of the object F and the output 35C in FIG. 5, but any combination of the following can be used to obtain the desired relationship:

1) modification of the amplitude function of the light source;

2) use of a convergent, divergent, or collimated beam of light;

3) variation of the shape of the aperture;

4) variation of the shape of the edges of the photodetectors that lie along the axis rotated by the angle theta ($\theta$);

5) variation of the edges of the photodetectors so as to block light and act as an integral aperture plate; or 6) variation of the uniformity of response of the photodetectors, for example by varying the reflectivity or transmissibility of the surface of the photodetectors.

FIG. 6 illustrates a bi-cell detector wherein the object (e.g. filament path F) intersects the space between the detector cells and $\theta = 0°$. Six different forms of increase in filament size (bumps) are shown along with the corresponding unique signal waveforms.

Figure 8:
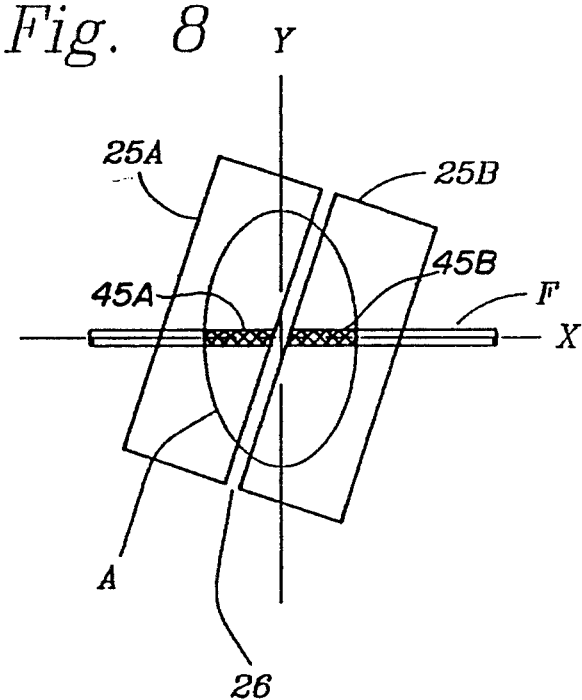
FIG. 8 is a schematic drawing of one possible configuration of how the light may impinge on the detector if a moving filament to be measured were aligned with the x axis.

Referring to FIG. 8, which is a view toward the faces of the pair of photodetectors 25A, 25B, light beam 17 is directed toward the intersection of the x and y axes (as illustrated) which are coincident, respectively, with the path of filament F and with a bisector of that path. The shaped beam 17 (less the shadow created by the region of filament F moving across that beam) impinges on the two spaced sensors 25A, 25B. The sensors can be set (or supported) such that the narrow space between them crosses the intersection of the x and y axes at some predetermined angle $\theta$ greater than or equal to 0° and less than 900° from the y axis. The object F (which represents the region of a filament F crossing beam 17) is coincident with the x axis, and casts shadows 45A and 45B on the sensors. It can be seen that in this geometry, shadow 45A is equal in area to shadow 45B, and it follows that the electrical signal from sensor 25A is then equal to the signal from sensor 25B. With the sensors or photodetectors 25A and 25B connected electrically as in FIG. 5, it then follows that the difference in the electrical signals input to difference amplifier 35 results in a zero potential at output 35C (excluding any inherent offset potential present in the amplifier).

Figure 10:
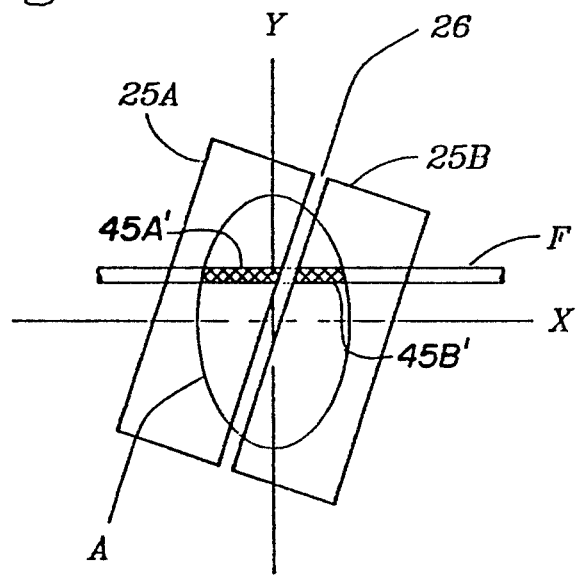

Referring to FIG. 10, the object F is shown displaced positively upward in the y direction and casts shadows 45A' and 45' on sensors 25A and 25B. If the angle $\theta$ is equal to 0°, the area of shadow 45A' would still be equal to the area of shadow 45B', and the electrical signal from the two sensors or photodetectors would be equal, and the difference in the electrical signals to the difference amplifier 35 would again yield a zero potential at output 35C. However, by tilting the sensors so the angle $\theta$ is at some angle greater than 0° and less than 90°, then the area of shadow 45A' is be greater than the area of shadow 45B', and the difference in the electrical signals to difference amplifier 35 results in an output signal greater than zero.

Figure 9:
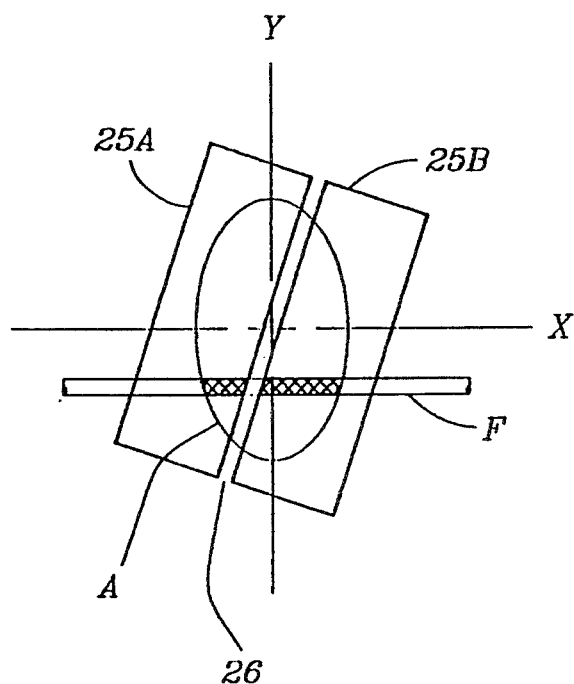
FIGS. 9 and 10 are drawings similar to FIG. 8, showing possible configurations of how the light may impinge on the detector if an object to be measured were displaced above, or below, the x axis.

Similarly, referring to FIG. 9, with the object F displaced negatively in the y direction, it casts shadows 45A" and 45B" on the sensors 25A, 25B and with angle $\theta$ is set at an angle greater than 0° and less than 90°, the area of shadow 45A" is less than the area of shadow 45B" and the difference in the electrical signals to difference amplifier 35 results in a output signal less than zero.

Thus the general conditions described with respect to FIGS. 5–10 constitute the basic method and apparatus for measuring changes in the lateral displacement of an object resident on the Y axis of the detector bi-cell. FIG. 4. shows a change in the lateral dimension of the object F. The change could be either increasing or decreasing; for illustration it is shown as increasing, e.g. a "bump" on the object. The object motion in this example is along the Y axis and could be in either direction. As the change in object dimension is introduced to the light beam, the area of the shadow 45 will increase. If the photodetectors are connected electrically as in FIG. 5, then the electrical output 4 of the difference amplifier will appear as in FIG. 7. If the object is displaced laterally in the y direction, such as in FIG. 9, and the object had a lateral change in dimension and was moved left to right, then the electrical output will appear as in FIG. 7A–F where the signal is stretched in time due to longer distance traversed by the change in dimension over photodetector 1 and the shorter distance traversed by the change in dimension over photodetector 2. The signal is also offset by the lateral displacement as previously noted.

The signals output from comparators 38A, 38B can be used to indicate the location, the frequency of, and the size (both length and diameter) of bumps or neck-downs in a length of filament inspected. While the needs and desires of the ultimate user will dictate the exact nature of the use of this information, it might for example be recorded along with a tachometer signal to indicate where in a roll of filament these perturbations occur, and/or the outputs of the comparators can be directed to counters which record the number of each type of deformity in the filament. The signals can also be employed to operate a threshold control device which might halt the production if the number and size of perturbations per given length of filament exceeds a predetermined acceptable minimum. Outputs indicating displacement of the filament (FIGS. 9 and 10) can be used together with data on filament diameter and its mass/unit length to calculate tension in the filament and produce a corresponding signal, and that resulting signal can be used for various control purposes.

Figure 3B:
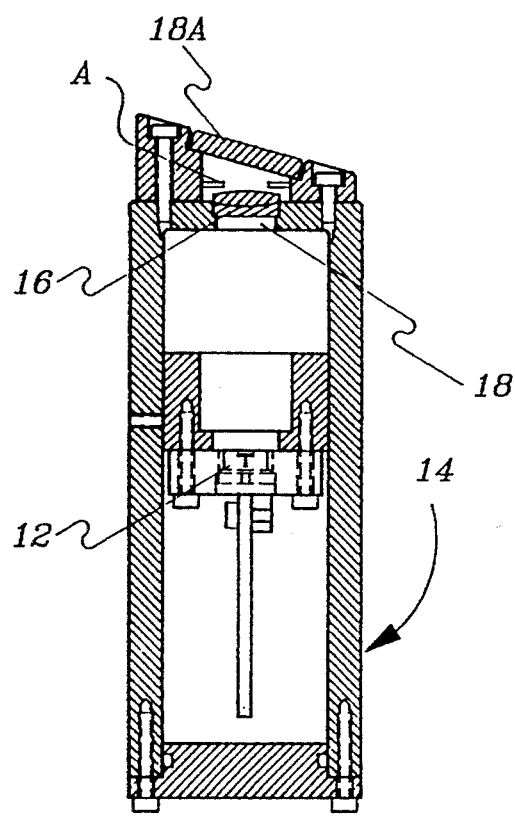
Figure 11:
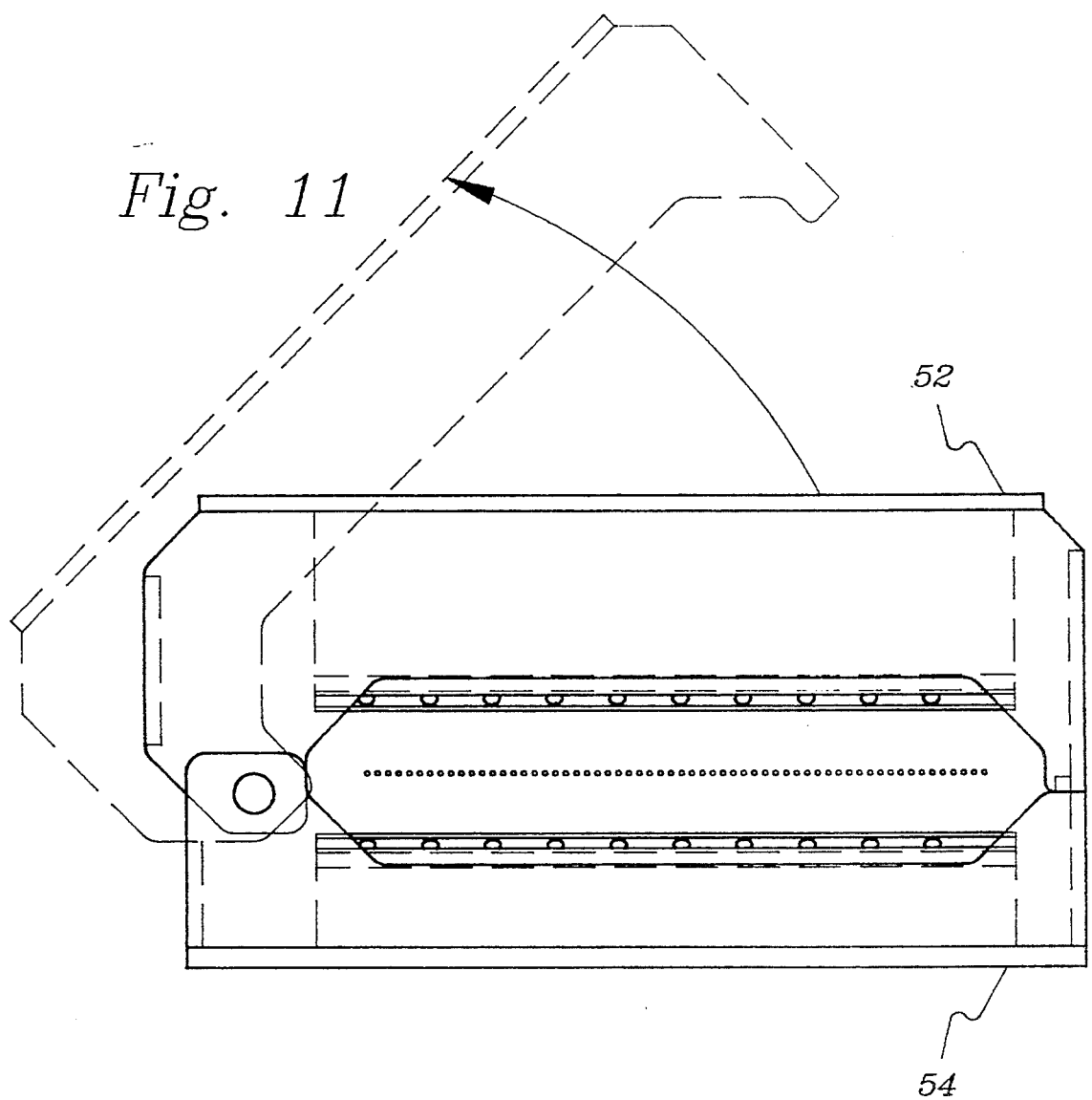
FIG. 11 is a view illustrating an array of filament detector parts and corresponding target parts for a multi-filament inspection system utilizing duplicated components of the type shown in FIGS. 1-3.
Figure 12:
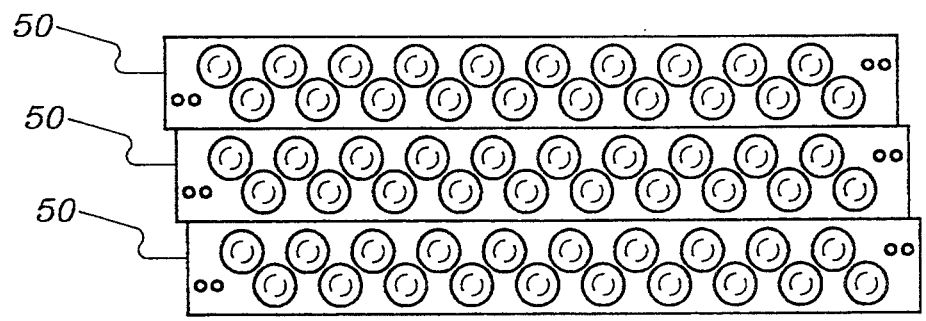
FIG. 12 is a view of the array itself, showing the relationship of the parts to each of the filament paths.
Figure 13:
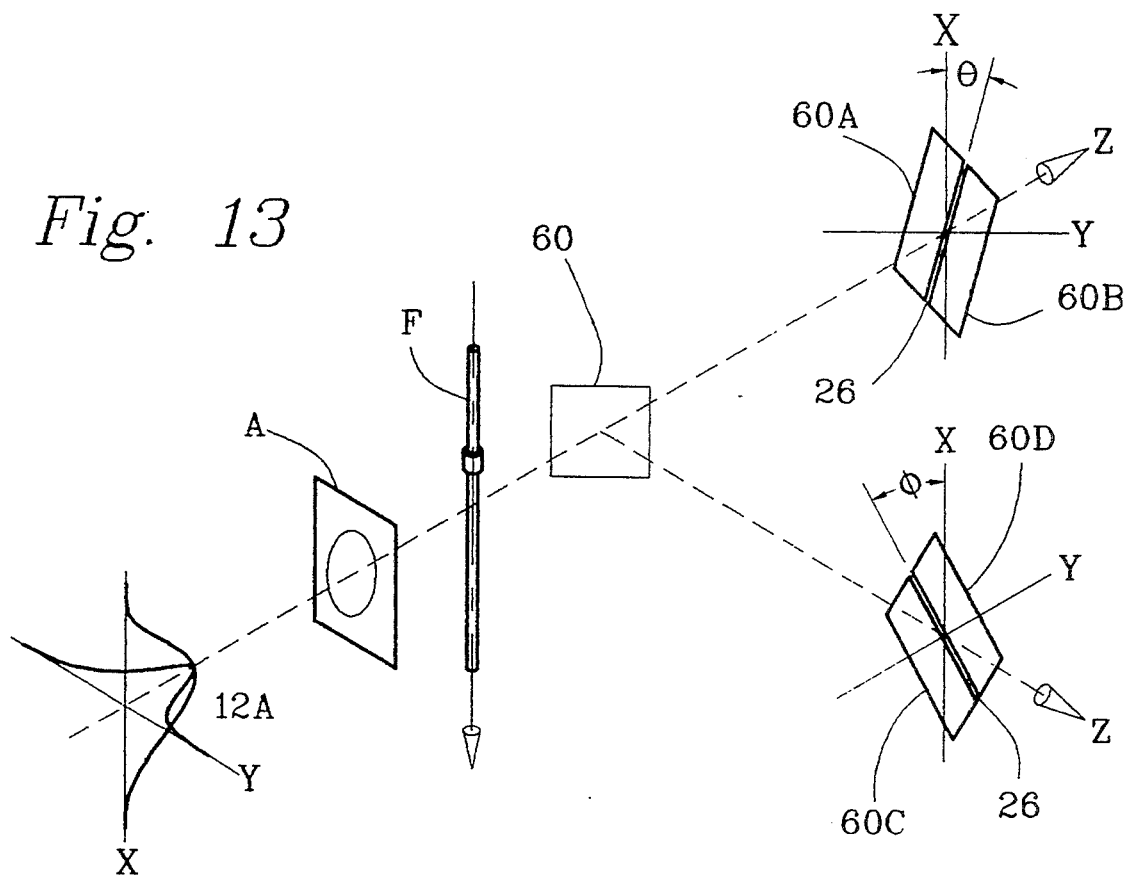
FIG. 13 is a schematic diagram of a configuration of a continuous scanning device using two detectors (four sensors)
Figure 14:
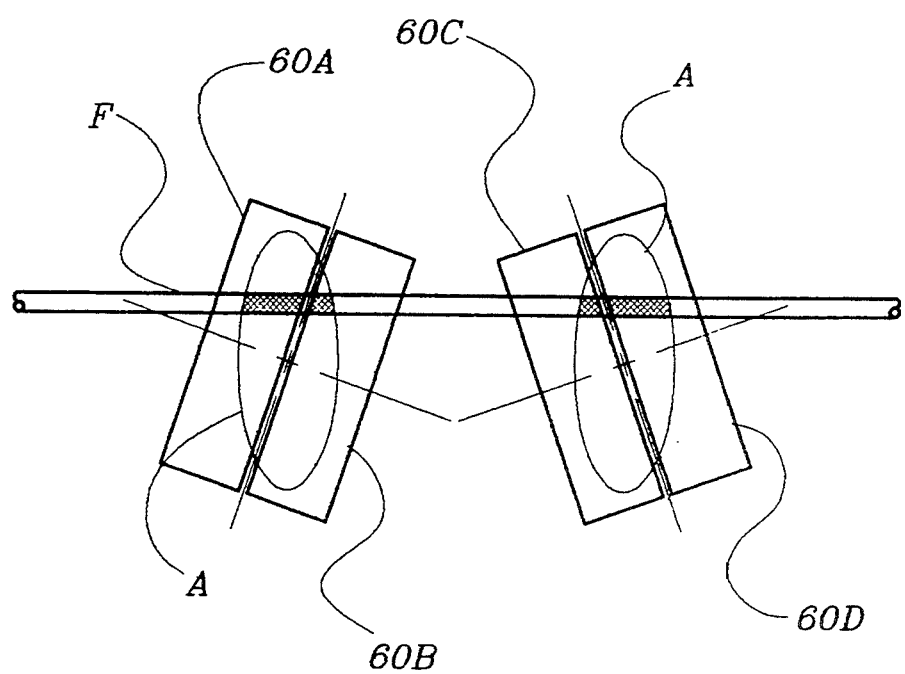
FIG. 14 is a schematic drawing, similar to FIG. 1, showing how light may impinge on the two detectors as illustrated in FIG. 13.
Figure 15:
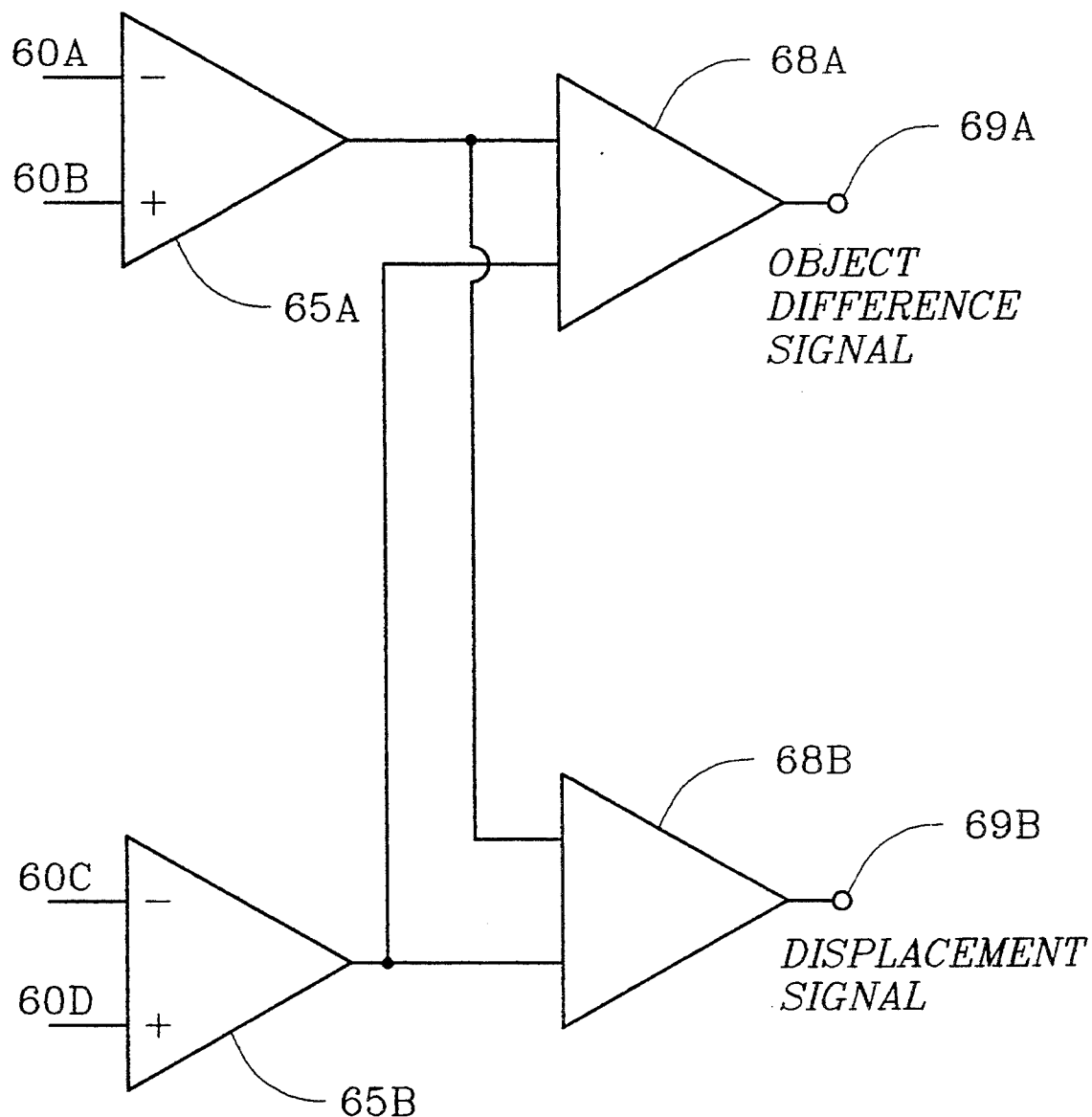
FIG. 15 is a circuit diagram showing the electrical connection of the four sensors with difference amplifiers and a summing amplifier.
Figure 16:
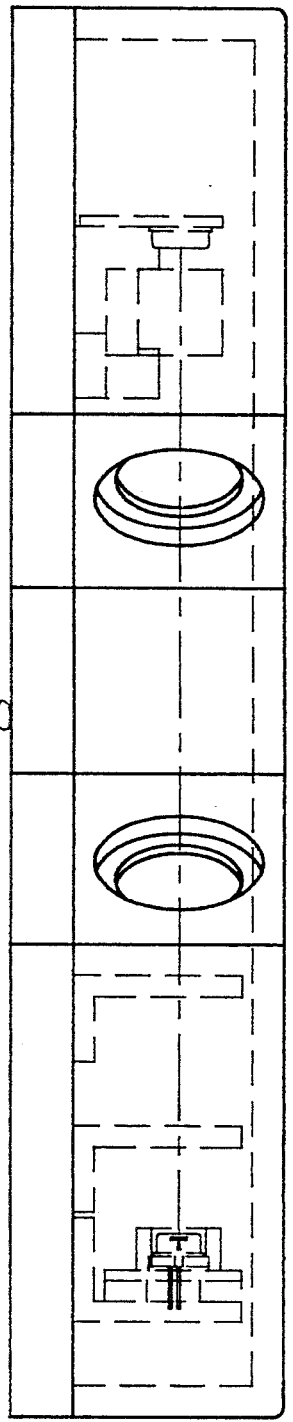
FIGS. 16 and 17 are top and side views, respectively, of a housing arrangement for the four detector filament inspecting system.
Figure 17:
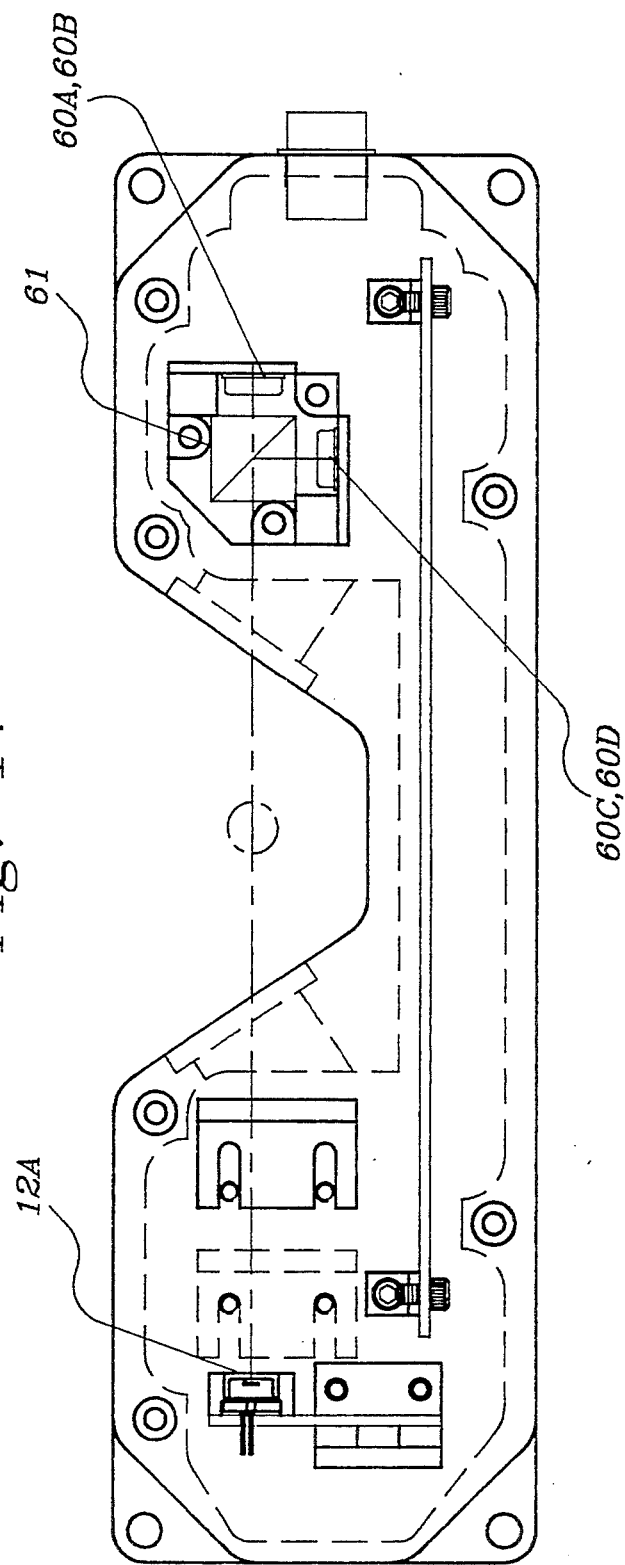

FIG. 11 shows an inspection system for multiple filaments, in which an array of light source units and target/detector units (as shown in FIGS. 1-3) are mounted aligned on opposite sides of each path of one of the multiple filaments. Sixty light sources 12 are supported in modules 50 of twenty each (FIG. 12), divided into two rows as shown so as to align with different paths across the modules. Each module is also mounted offset from the others, resulting in a total of sixty different scanning paths, for up to sixty filaments. These multiples are illustrative only, and are not to be considered as limiting, The light source units are precisely supported in an openable cover 52 which can be tilted away from the base 54 in which the target/detector units are likewise precisely aligned. This allows the entire array to be accessed for maintenance, as needed, without disturbing the filament path area.

Another embodiment of the invention, referring to FIGS. 13-17, involves the addition of a beam splitter 60 and two pairs of photodetectors 60A, 60B and 60C, 60D. Detector pair 60A, 60B is set at a predetermined angle $\theta$ greater than or equal to 0° and less than 90°, and detector pair 60C, 60D is set at a corresponding but negative angle $\phi$ between 270° and 0°. An object having a change in lateral dimension and a lateral displacement introduced to the apparatus, such as a filament moving along a path P between the aperture A and beam splitter 60. In a fashion similar to that previously describeds the photodetectors 60A, 60B and 60C, 60D may be electrically connected as in FIG. 15.

The outputs of detectors 60A and 60B are directed to the two inputs of a first difference amplifier 65A, and the outputs of detectors 60C, 60D are directed to a second difference amplifier 65B. The outputs of these two difference amplifiers are directed to the respective inputs of a summing amplifier 68A and a difference amplifier 68B, and the ultimate electrical outputs result in an object difference signal 69A from the summing amplifier 68A and a displacement signal 69B from the difference amplifier 68B.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A method of non-contact measuring and examining the lateral dimension and lateral displacement of a thin elongated object comprising the steps of:
   providing a source of radiation and shaping radiation from the source into a beam of known amplitude distribution function and predetermined cross-sectional configuration;
   providing a detector having a variable output in response to the quantity of such radiation impinging on the detector, the detector including at least two sensors in closely spaced relationship to each other along a separation line, the cross-sectional area of said the beam being symmetrical with respect to the areas of the two sensors;
   directing the beam along a predetermined first axis across an area where an object to be measured is introduced along a second axis transversely to the first axis of the beam and onto the detector, said second axis being transverse to the separation line between the sensors;
   introducing an object to be inspected into the beam within such area, the object being capable of altering the beam by absorption or displacement of parts of the cross-sectional shape of the beam prior to the beam impinging on the sensors of the detector;
   causing relative movement between the beam and the object along said second axis; and
   applying the outputs of the two sensors to separate inputs of a difference amplifier whereby the amplifier output represents the change in shape of the beam due to changes in total radiation.

2. The method of claim 1 wherein the source of radiation is chosen from a group having a known amplitude distribution, comprising an x-ray source, an incandescent lamp, a light emitting diode, a laser, or a diode laser.

3. The method of claim 1, wherein the step of shaping the beam is performed by a clear aperture shaped to provide a predetermined relationship between lateral displacement and the detector difference signal.

4. The method of claim 1, further including forming a collimated beam from the radiation source.

5. The method of claim 1, wherein the step of introducing an object into the beam comprises moving a filament of extended length crosswise through the beam to expose incremental areas of the filament to the radiation of the beam, thereby creating a shadow of the filament area on the detector.

6. The method of claim 1, further including
   splitting the beam after such beam passes the object and directing the split beam onto two separate detectors each including a pair of radiation sensors.

7. The method of claim 1, further including
   arranging a plurality of corresponding radiation transmitters and detectors in an array and passing each one of a plurality of separate objects between a transmitter and detector to produce separate outputs corresponding to each object.

8. The method of claim 1, further including
   producing separate output signals of positive going and negative going outputs from said sensors.

9. Apparatus for continuous non-contact measuring and examining of thin long objects, comprising
   a radiation source of known amplitude distribution function and predetermined cross-sectional configuration.
   a detector having a variable output in response to radiation from said source impinging on the detector, said detector including at least two sensors supported in closely spaced relationship to each other along a separation line, said sensors having separate electrical outputs each varying with the quantity of the radiation to which the respective said sensor is exposed,
   means for forming a beam from said radiation source and directing said beam along a predetermined first axis and across an area where the object to be measured is introduced transversely to said first axis of the beam and onto the detector, the cross-sectional area of said the beam being symmetrical with respect to the areas of the two sensors;

means for moving the object to be inspected along a second axis transversely through said beam whereby incremental areas of the object exposed to the radiation of the beam will alter the shape of at least part of the beam prior to the beam impinging on said sensors, said second axis being transverse to said separation line between said sensors;

a difference amplifier having separate inputs connected one to each of said outputs of said sensors whereby the amplifier output represents changes in shape of said beam corresponding to changes in the cross-section of the object passing through said beam.

10. Apparatus for continuous non-contact monitoring and examining of thin long objects being moved along their length, comprising a radiation source of known amplitude distribution function, a detector having a variable output in response to radiation from said source impinging on the detector, said detector including at least two sensors having flat surfaces supported in closely spaced coplanar relationship to each other with a uniform separation line between them, each said sensor having a separate electrical output varying with the quantity of the radiation to which said sensor is exposed, means for forming a radiation beam of predetermined cross-sectional configuration from said radiation source and directing said beam along a predetermined first axis onto said sensor surfaces of said detector, said beam projecting across an area where the object to be measured is introduced transversely to the axis of the beam and the beam and the object are moved relative to each other whereby successive parts of the thin long object shield a portion of one or both of said sensor surfaces from part of the radiation beam, the cross-sectional area of said beam being symmetrical with respect to said areas of said two sensors;

means for moving the object to be inspected along a second axis and through said beam, said second axis being transverse to said separation line between said sensors, whereby incremental areas of the object exposed to the radiation of the beam create areas within the beam which are shaded from the remainder of the beam to alter the shape of at least part of the beam prior to the beam impinging on said sensors and to cause changes in output of said sensors.

11. Apparatus as defined in claim 10, further including a difference amplifier having separate inputs connected one to each of said outputs of said sensors whereby the amplifier output represents changes in shape of said beam corresponding to changes in the cross-section of the object passing through said beam.

12. Apparatus as defined in claim 11, further including first and second comparator circuits, means for directing positive going outputs from said difference amplifier to said first comparator circuit and for directing negative going outputs to said second comparator circuit, whereby different control signals can be derived from said comparator circuits in correspondence to different condition changes in the monitored object.

13. Apparatus as defined in claim 10, further including a beam splitter supported between the object to be monitored and said detector, said detector being a first detector onto which impinges radiation of one beam from said beam splitter, a second detector also including at least two second sensors in closely spaced coplanar relation and mounted such that radiation impinges thereon of a second beam from said beam splitter, said second sensors having separate outputs.

14. Apparatus as defined in claim 13, further including a first difference amplifier having separate inputs connected one to each of said outputs of said sensors of said first detector, a second difference amplifier having separate inputs connected one to each of said outputs of said second sensors.

15. Apparatus as defined in claim 14, further including a summing amplifier having inputs from each of said first and second difference amplifiers.

16. Apparatus as defined in claim 15, further including a third difference amplifier having inputs from each of said first and second difference amplifiers.

* * * * *